United States Patent
Duan et al.

(10) Patent No.: US 10,217,030 B2
(45) Date of Patent: Feb. 26, 2019

(54) HIEROGLYPHIC FEATURE-BASED DATA PROCESSING

(71) Applicant: INTERNATIONAL BUSINESS MACHINES CORPORATION, Armonk, NY (US)

(72) Inventors: Dongxu Duan, Beijing (CN); Jian Min Jiang, Beijing (CN); Zhong Su, Beijing (CN); Li Zhang, Beijing (CN); Shi Wan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/622,131

(22) Filed: Jun. 14, 2017

(65) Prior Publication Data

US 2018/0365528 A1 Dec. 20, 2018

(51) Int. Cl.
*G06K 9/62* (2006.01)
*G06K 9/72* (2006.01)
*G06K 9/00* (2006.01)
*G06N 3/04* (2006.01)

(52) U.S. Cl.
CPC ....... *G06K 9/6269* (2013.01); *G06K 9/00416* (2013.01); *G06K 9/726* (2013.01); *G06N 3/0445* (2013.01); *G06N 3/0454* (2013.01)

(58) Field of Classification Search
USPC .............................. 235/435; 382/187; 704/9
See application file for complete search history.

(56) References Cited

U.S. PATENT DOCUMENTS

| | | | |
|---|---|---|---|
| 7,702,599 B2 * | 4/2010 | Widrow | ............ G06F 17/30247 382/155 |
| 8,768,059 B2 | 7/2014 | Mitic | |
| 9,251,431 B2 | 2/2016 | Doepke et al. | |
| 9,613,227 B1 * | 4/2017 | Kothari | ............... G06F 21/6254 |
| 10,007,867 B2 | 6/2018 | Yu et al. | |

(Continued)

FOREIGN PATENT DOCUMENTS

| | | |
|---|---|---|
| CN | 103309926 A | 9/2013 |
| CN | 105678293 A | 6/2016 |
| CN | 107025219 A | 8/2017 |

OTHER PUBLICATIONS

Ma, X., et al., "End-to-End Sequence Labeling via Bi-directional LSTM-CNNs-CRF," Language Technologies Institute, Carnegie Mellon University, May 29, 2016, p. 1-12.*

(Continued)

*Primary Examiner* — Xuemei Chen
(74) *Attorney, Agent, or Firm* — Reza Sarbakhsh (57) ABSTRACT

A computer-implemented method and a system are proposed. According to the method, in response to receiving a character, a first representation of the character is generated by performing word embedding processing on the character. The first representation is related to context of the character. A second representation of the character is generated by performing convolutional neural network (CNN) processing on the character. The second representation is related to a hieroglyphic feature of the character. A label for the character is determined by performing recurrent neural network (RNN) processing on the first representation and the second representation. The label indicates an attribute of the character related to the context.

20 Claims, 5 Drawing Sheets

(56) References Cited

U.S. PATENT DOCUMENTS

| | | | | |
|---|---|---|---|---|
| 2011/0006929 | A1* | 1/2011 | Fux | G06F 3/018 |
| | | | | 341/24 |
| 2012/0091203 | A1* | 4/2012 | Al-Omari | G06K 7/14 |
| | | | | 235/435 |
| 2012/0242516 | A1* | 9/2012 | Zhang | G06F 3/0237 |
| | | | | 341/28 |
| 2012/0253792 | A1* | 10/2012 | Bespalov | G06F 17/30707 |
| | | | | 704/9 |
| 2014/0363082 | A1* | 12/2014 | Dixon | G06K 9/00402 |
| | | | | 382/187 |
| 2015/0347860 | A1 | 12/2015 | Meier et al. | |

OTHER PUBLICATIONS

Liu, S., et al., "Complex image and text sequence identification method based on CNN-RNN," English translation of Chinese Patent Publication CN105678293 (A), published Jun. 15, 2016.*

Duan, et al., "Hieroglyphic Feature-Based Data Processing", U.S. Appl. No. 15/848,329, filed Dec. 20, 2017, pp. 1-22.

IBM Appendix P, "List of IBM Patents or Patent Applications Treated as Related", Dated Dec. 20, 2017, 2 pages.

Cai et al., "Neural Word Segmentation Learning for Chinese", arXiv:1606.043002V2, [cs.CL], Dec. 2, 2016, pp. 1-32.

Zhang et al., "Transition-Based Neural Word Segmentation", ResearchGate, https://www.researchgate.net/publication/306093298, conference paper, Jan. 2016, pp. 1-12.

Ma et al., "End-to-end Sequence Labeling via Bi-directional LSTM-CNNs-CRF", Language Technologies Institute, Carnegie Mellon University, arXiv:1603.01354v5 [cs.LG] May 29, 2016, pp. 1-12.

* cited by examiner

HIEROGLYPHIC FEATURE-BASED DATA PROCESSING

BACKGROUND

The present invention relates to data processing, and more specifically, to hieroglyphic feature-based data processing. Natural language processing (NLP) is concerned with the interactions between computers and human languages and, in particular, concerned with programming computers to process large natural language corpora. Challenges in NLP frequently involve natural language understanding, natural language generation, connecting language and machine perception, managing human-computer dialog systems, or some combination thereof. Major evaluations and tasks in NLP include Word segmentation, part-of-speech (POS) tagging, name entity recognition (NER), or the like. However, these tasks are inefficient in Chinese sequence labeling.

SUMMARY

According to one embodiment of the present invention, there is provided a computer-implemented method. According to the method, in response to receiving a character, a first representation of the character is generated by performing word embedding processing on the character. The first representation is related to context of the character. A second representation of the character is generated by performing convolutional neural network (CNN) processing on the character. The second representation is related to a hieroglyphic feature of the character. A label for the character is determined by performing recurrent neural network (RNN) processing on the first representation and the second representation. The label indicates an attribute of the character related to the context.

According to another embodiment of the present invention, there is provided a system. The system includes one or more processors. The one or more processors are configured to, in response to receiving a character, generate a first representation of the character by performing word embedding processing on the character, and generate a second representation of the character by performing CNN processing on the character. The first representation is related to context of the character, and the second representation is related to a hieroglyphic feature of the character. The one or more processors are further configured to determine a label for the character by performing RNN processing on the first representation and the second representation. The label indicates an attribute of the character related to the context.

According to yet another embodiment of the present invention, there is provided a computer program product. The computer program product comprising a computer readable storage medium having program instructions embodied therewith, the program instructions executable by a device to cause the device to, in response to receiving a character, generate a first representation of the character by performing word embedding processing on the character, the first representation being related to context of the character, generate a second representation of the character by performing CNN processing on the character, the second representation being related to a hieroglyphic feature of the character, and determine a label for the character by performing RNN processing on the first representation and the second representation, the label indicating an attribute of the character related to the context.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
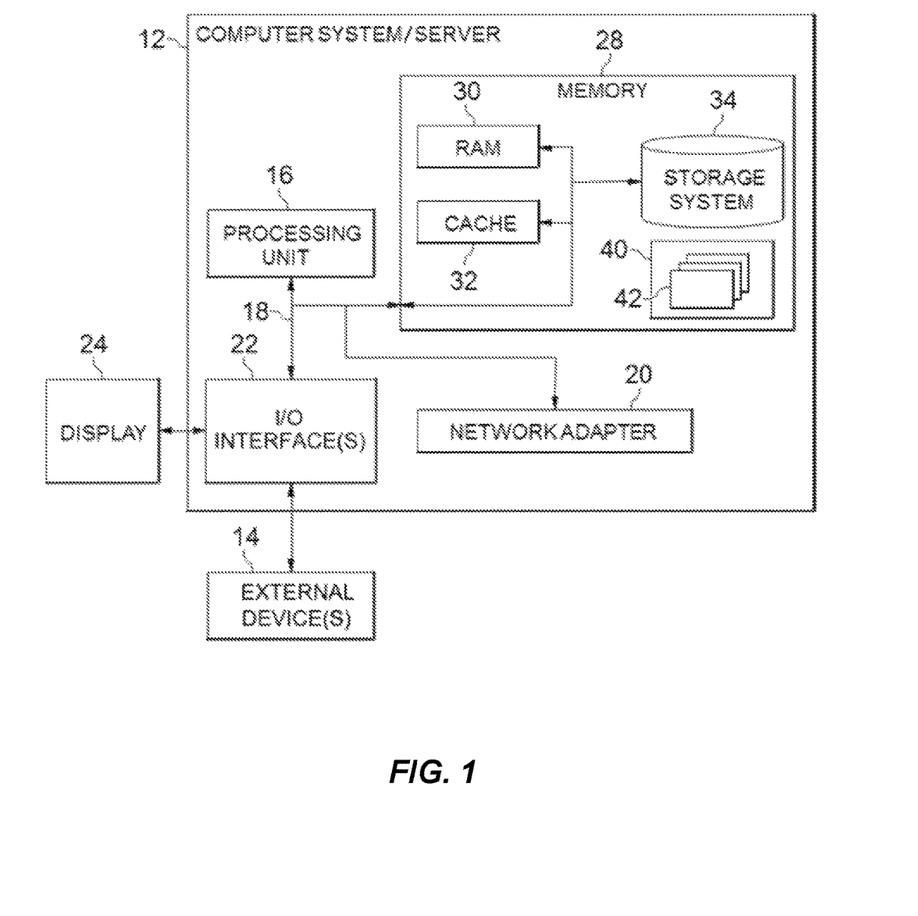
FIG. 1 shows an exemplary computer system which is applicable to implement the embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Word segmentation, POS tagging, NER, or the like are the fundamental tasks in NLP. These tasks can be formulated by assigning labels to words of an input sentence. For example, in the case of word segmentation, a character may be assigned a label including NN, RB, VB, JJ or the like, where NN represents noun, RB represents adverb, VB represents verb, and JJ represents adjective.

In Latin language like English, a word is composed of characters, and the morphological information like affixes can be leveraged to enhance the sequence labeling tasks like word segmentation, POS tagging and NER, and CNN has been proved to be an effective approach to extract morphological information from characters of words and encode it into neural representations. However, for hieroglyphic languages like Chinese, Egyptian hieroglyphs, cuneiform or the like, there is no character sequence for a hieroglyphic character.

In order to solve the above and other potential problems, according to implementations of the present disclosure, a new approach for extracting hieroglyphic information from Chinese characters and combining the information with word embedding to enhance sequence labeling tasks is proposed. Although there is no character sequence for a Chinese character, the hieroglyphic features of the Chinese character, for example the stroke or radical, contain rich information about the meaning of that Chinese character, and can be leveraged for improving the performance and efficiency of sequence labeling. Although the following embodiments are directed to Chinese character, those skilled in the art would readily appreciate that these embodiments are merely illustrative. The new approach can also be applied to other types of hieroglyphic characters, such as the Egyptian hieroglyphs described above.

Figure 2:
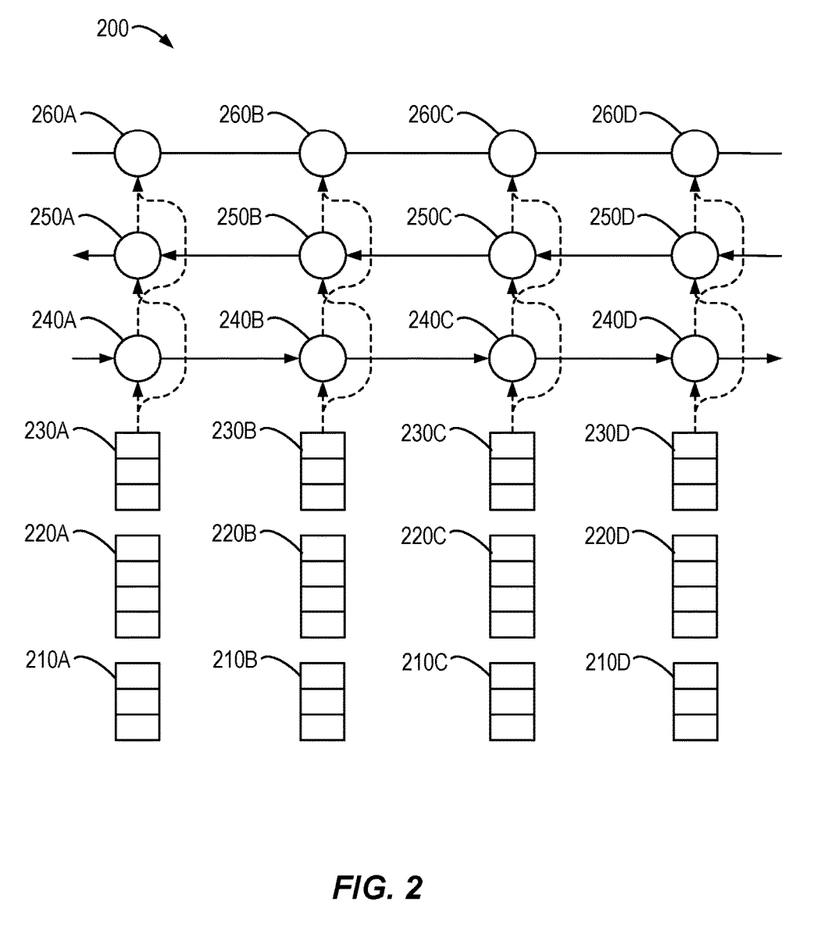
FIG. 2 is a schematic diagram of a method of performing Chinese sequence labeling in accordance with embodiments of the present disclosure.

FIG. 2 is a schematic diagram of a method 200 of performing Chinese sequence labeling in accordance with embodiments of the present disclosure. A sequence of Chinese characters may be received and processed using the method 200. For example, the sequence of Chinese characters is "我很害怕", which means "I'm scared".

The Chinese characters may be mapped to initial character representations according to one-hot encoding. A one-hot vector is a 1×N matrix/vector used to distinguish each word in a vocabulary from every other word in the vocabulary. The vector consists of 0s in all cells with the exception of a single 1 in a cell used uniquely to identify the word. For example, the Chinese character "我" is mapped to the initial character representation 210A (for example, [1, 0, 0, 0, . . . ]), the Chinese character "很" is mapped to the initial character representation 210B (for example, [0, 1, 0, 0, . . . ]), the Chinese character "害" is mapped to the initial character representation 210C (for example, [0, 0, 1, 0, . . . ]), and the Chinese character "怕" is mapped to the initial character representation 210D (for example, [0, 0, 0, 1, . . . ]).

The initial character representations 210A-210D (collectively referred to as the initial character representation 210) may be processed by word embedding processing to generate first representations 220A-220D (collectively referred to as the first representation 220) of the Chinese characters 210A-210D, respectively. The word embedding is the collective name for a set of language modeling and feature learning techniques in NLP where words or phrases from the vocabulary may be mapped to vectors of real numbers. It may involve a mathematical embedding from a space with one dimension per word to a continuous vector space with much lower dimension. In this case, the first representation 220 may be a vector, and dimension of the vector may be set as required.

For example, the initial character representation 210A is mapped to the first representation 220A (for example, [1.1, 0.7, 0.9, 1.2, . . . ]), the initial character representation 210B is mapped to the first representation 220B (for example, [0.6, 1.1, 0.03, 0.45, . . . ]), the initial character representation 210C is mapped to the first representation 220C (for example, [1.8, 1.8, 0.04, 0.7, . . . ]), and the initial character representation 210D is mapped to the first representation 220D (for example, [0.5, 0.6, 0.7, 1, . . . ]).

The word embedding may be used to quantify and categorize semantic similarities between the words or phrases based on their distributional properties in large samples of language data. Accordingly, the first representations 220A-220D may be related to context of the Chinese characters. In particular, the first representations 220A-220D may be related to semantic similarities of the Chinese characters. For example, the Chinese character "风" is mapped to the first representation [0.5, 0.1, 0.4, 1.7, . . . ], the Chinese character "雨" is mapped to the first representation [0.8, 0.3, 1.2, 1.5, . . . ], and the Chinese character "书" is mapped to the first representation [1, 1, 10, 100, . . . ]. Since the Chinese character "风" and Chinese character "雨" are semantically similar, the vector distance between the Chinese character "风" and the Chinese character "雨" is smaller than the vector distance between the Chinese character "风" and the Chinese character "书"

Additionally, the Chinese characters may be processed by CNN processing to generate second representations 230A-230D (collectively referred to as the second representation 230). The second representation 230 may be related to at least one hieroglyphic feature of the Chinese character. In some embodiments, the second representation 230 may also be a vector, and dimension of the vector may also be set as required.

The CNN processing may be performed on at least one stroke of the Chinese character, and/or on the image of the Chinese character. The second representation 230 may be the result of the CNN processing on the stroke(s), or the result of the CNN processing on the image, or in combination. For example, the result of the CNN processing on the stroke(s) and the result of the CNN processing on the image may be concatenated to generate the second representation 230.

The CNN is a type of feed-forward artificial neural network. The CNN consists of multiple layers of receptive fields. The CNN may include local or global pooling layers, which combine the outputs of neuron clusters. The CNN may also include various combinations of convolutional and fully connected layers. Some example implementations of the CNN processing on the stroke(s) and the image will be described later with reference to FIG. 3 and FIG. 4, respectively.

The first representation 220 and the second representation 230 of the Chinese character may be input into RNN processing. For example, the first representations 220A-220D and the second representations 230A-230D may be concatenated, respectively, and input into the RNN processing.

In the case that the second representation 230 is concatenated by the result of the CNN processing on the stroke(s) and the result of the CNN processing on the image, the first representation 220 and the concatenated second representation 230 may be input into the RNN processing. The RNN processing may, for example, adjust the weight of the result of the CNN processing on the stroke(s) and the result of the CNN processing on the image adaptively, so as to improve the accuracy of assigning labels to the Chinese character.

The RNN is a class of artificial neural network where connections between neuron-like units form a directed cycle. As shown, the RNN includes a forward RNN layer and a backward RNN layer. As an example, the forward RNN layer includes four neuron-like units 240A-240D forming a directed cycle, and the backward RNN layer also includes four neuron-like units 250A-250D forming a directed cycle. This creates an internal state of the network which allows it to exhibit dynamic temporal behavior. The RNN can use its internal memory to process arbitrary sequences of inputs, and output a probability distribution vector. This makes the RNN applicable to NLP tasks such as Word segmentation, POS tagging, NER, or the like.

For example, in the case of POS tagging, the RNN generates probability distribution vectors which represent the probability of the part-of-speech of the Chinese characters. In some embodiments, the RNN may be enhanced with long short-term memory (LSTM), bidirectional long short-term memory (BLSTM), or the like.

For sequence labeling tasks, it is beneficial to consider the correlations between labels in neighborhoods and jointly decode the best chain of labels for a given input sentence. For example, in POS tagging an adjective is more likely to be followed by a noun than a verb. Therefore, label sequence is modeled jointly using a conditional random field (CRF), instead of decoding the label independently. The CRF is a class of statistical modelling method, where it is used for structured prediction. Whereas an ordinary classifier predicts a label for a single sample without regard to "neighboring" samples, the CRF can take context into account.

Accordingly, in some embodiments, the probability distribution vectors generated by the RNN may be optionally input to CRF processing. As an example, the CRF includes four units 260A-260D, to improve the performance of determining the labels for the Chinese characters. For example, in the case of word segmentation, the labels "我/S 很/S 害/B 怕/E" are determined for the Chinese sequence "我很害怕", where S represents that the Chinese character is classified into a single Chinese character, B represents that the Chinese character is classified into the beginning of a Chinese word, and E represents that the Chinese character is classified into the end of a Chinese word.

In accordance with embodiments of the present disclosure, in comparison with the conventional sequence labeling method, the method 200 can extract hieroglyphic features from the Chinese words and combining them with word embedding to enhance sequence labeling tasks. As a result, the method 200 achieves high performance and efficiency in sequence labeling.

Figure 3:
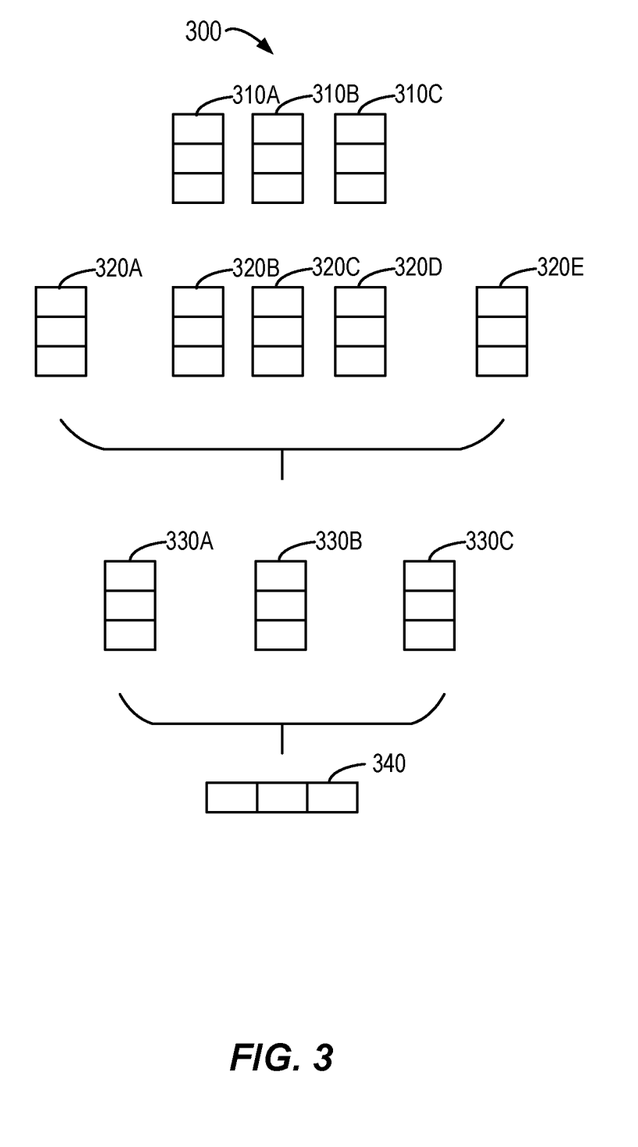
FIG. 3 is a schematic diagram of a method of extracting a hieroglyphic feature from at least one stroke representation of a Chinese character in accordance with embodiments of the present disclosure.

FIG. 3 is a schematic diagram of a method 300 of extracting a hieroglyphic feature from at least one stroke representation of a Chinese character in accordance with embodiments of the present disclosure. The following description takes the Chinese character "怕" as an example.

The Chinese character "怕" may be divided into at least one stroke according to Chinese character encoding mechanisms. The Chinese character encoding mechanisms may include but not limited to the Wubi Chinese character encoding method. In the case of the Wubi method, the Chinese character "怕" may be divided into three strokes "忄", "白", and "一", The divided stroke(s) may be mapped to initial stroke representation(s) according to the one-hot encoding. For example, the stroke "忄", is mapped to the initial stroke representation 310A (for example, [1, 0, 0, . . . ]), the stroke "白", is mapped to the initial stroke representation 310B (for example, [0, 1, 0, . . . ]), and the stroke "一", is mapped to the initial stroke representation 310C (for example, [0, 0, 1, . . . ]).

The initial stroke representation(s) may be processed by stroke embedding processing to generate stroke representation(s). In some embodiments, in the stroke embedding processing, a lookup table is used to generate the stroke representations. For example, a lookup table with values drawn from a uniform distribution with range [−0.1, 0.1] is randomly initialized to generate vectors representing the initial stroke representations. For example, the initial stroke representation 310A is mapped to the stroke representation 320B (for example, [0.1, 0.05, −0.07, . . . ]), the initial stroke representation 310B is mapped to the stroke representation 320C (for example, [0.06, 0.1, 0.06, . . . ]), and the initial stroke representation 310C is mapped to the stroke representation 320D (for example, [0.02, 0.09, −0.01, . . . ]).

The stroke representation(s) of the Chinese character may be expanded with at least one padding, such that the stroke representations of all Chinese character have equal length. For example, the Chinese character "忄" may have a length of three. In contrary, the Chinese Character "啡" may be divided into four strokes "口", "止", "八" and "丶", and thus have a length of four. It is assumed that the maximum length is five, in this case, the stroke representations of the Chinese character "忄" may be expanded with two paddings. The padding may represent a dummy stroke, and may be a predetermined vector, for example an all-zero vector [0, 0, 0, . . . , 0].

The expanded stroke representations, which are the stroke representations 320B-320D and the paddings 320A and 320E, are input into the CNN processing. The expanded stroke representations may be processed by convolution processing to generate convoluted stroke representations. For example, a predetermined number (for example, three) of stroke representations among the expanded stroke representations are averaged to generate the convoluted stroke representations 330A-330C (collectively referred to as the convoluted stroke representation 330), in which the convoluted stroke representation 330A is generated based on the padding 320A and the stroke representations 320B-320C (for example, the convoluted stroke representation 330A is [(0+0.1+0.06)/3, (0+0.05+0.1)/3, (0−0.07+0.06)/3, . . . ]), the convoluted stroke representation 330B is generated based on the stroke representations 320B-320D (for example, the convoluted stroke representation 330B is [(0.1+0.06+0.02)/3, (0.05+0.1+0.09)/3, (−0.07+0.06−0.01)/3, . . . ]), and the convoluted stroke representation 330C is generated based on the stroke representations 320C-320D and the padding 320E (for example, the convoluted stroke representation 330C is [(0.06+0.02+0)/3, (0.1+0.09+0)/3, (0.06−0.01+0)/3, . . . ]).

The convoluted stroke representation 330 may be further processed by sampling processing to extract the hieroglyphic feature of the Chinese character. For example, the convoluted stroke representation 330 may be max pooled, mean pooled, or the like, to generate the extracted hieroglyphic feature 340. In particular, the convoluted stroke representations 330A-330C are max pooled to generate the extracted hieroglyphic feature 340 (for example, [(0.1+ 0.06+0.02)/3, (0.05+0.1+0.09)/3, (0.06−0.01+0)/3, . . . ]). In some embodiments, the convolution processing and the sampling processing may be repeated for processing the stroke(s) of the Chinese character.

In accordance with embodiments of the present disclosure, the method 300 can extract hieroglyphic features from the strokes of the Chinese words. The hieroglyphic features facilitate the Chinese sequence labeling tasks to achieve high performance and efficiency.

Figure 4:
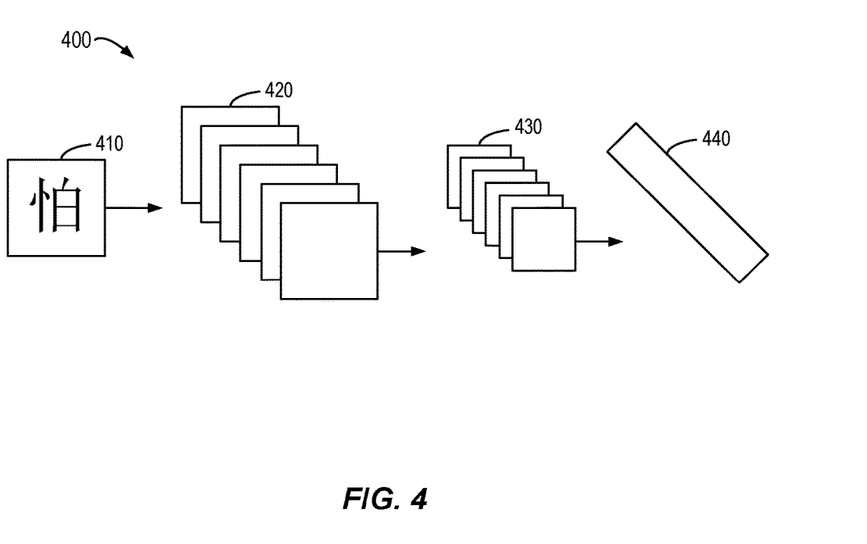
FIG. 4 is a schematic diagram of a method of extracting a hieroglyphic feature from an image of a Chinese character in accordance with embodiments of the present disclosure.

FIG. 4 is a schematic diagram of a method 400 of extracting a hieroglyphic feature from an image of a Chinese character in accordance with embodiments of the present disclosure. The following description also takes the Chinese character "忄" as an example.

The image 410 of the Chinese character "忄" may be processed by the CNN processing to generate the hieroglyphic feature of the Chinese character. The generated hieroglyphic feature may be related to the stroke, structure or any other information that facilitates assigning labels to the Chinese character. In some embodiments, convolution processing, sampling processing and full-connection processing may be processed on the image.

The convolution processing is characterized of sparse connectivity and shared weight. Regarding the sparse connectivity, for a certain pixel in the image, pixels closer to this pixel have greater effect on this pixel. In this case, a convolution operation on small regions of input is introduced to reduce the number of free parameters and improve generalization. In addition, regarding the shared weight, one major advantage of convolutional networks is the use of the shared weight in convolutional layers, which means that the same filter is used for each pixel in the layer. This both reduces memory footprint and improves performance.

In this case, the image may be convoluted with the filters to generate a convoluted result. For example, the image 410 may be 5 pixels×5 pixels in size, and there may be six filters, each of which is 3 pixels×3 pixels in size. The example of the image 410 convoluting with one of the six filters is shown below:

$$\begin{bmatrix} 1 & 1 & 1 & 0 & 0 \\ 0 & 1 & 1 & 1 & 0 \\ 0 & 0 & 1 & 1 & 1 \\ 0 & 0 & 1 & 1 & 0 \\ 0 & 1 & 1 & 0 & 0 \end{bmatrix} \rightarrow \begin{bmatrix} 1 & 0 & 1 \\ 0 & 1 & 0 \\ 1 & 0 & 1 \end{bmatrix} \rightarrow \begin{bmatrix} 4 & 3 & 4 \\ 2 & 4 & 3 \\ 2 & 3 & 4 \end{bmatrix}$$

This convolution processing is repeated for the other five filters, and a convoluted result 420 of six channels is generated.

In the sampling processing, the convoluted result 420 may be sampled to generate the sampled result 430. For example, the convoluted result 420 may be max pooled, mean pooled, or the like, to generate the sampled result 430. The example of the convoluted result 420 being max pooled with a 2×2 filter is shown below.

$$\begin{bmatrix} 4 & 3 & 4 \\ 2 & 4 & 3 \\ 2 & 3 & 4 \end{bmatrix} \rightarrow \begin{bmatrix} 4 & 4 \\ 4 & 4 \end{bmatrix}$$

In some embodiments, the convolution processing and the sampling processing may be repeated for processing the image of the Chinese character. Then, in the full-connection processing, the sampled result 430 may be fully connected to generate the extracted hieroglyphic feature 440 of the Chinese character.

In accordance with embodiments of the present disclosure, the method 400 can extract hieroglyphic features from the images of the Chinese words. The hieroglyphic features facilitate the Chinese sequence labeling tasks to achieve high performance and efficiency.

Figure 5:
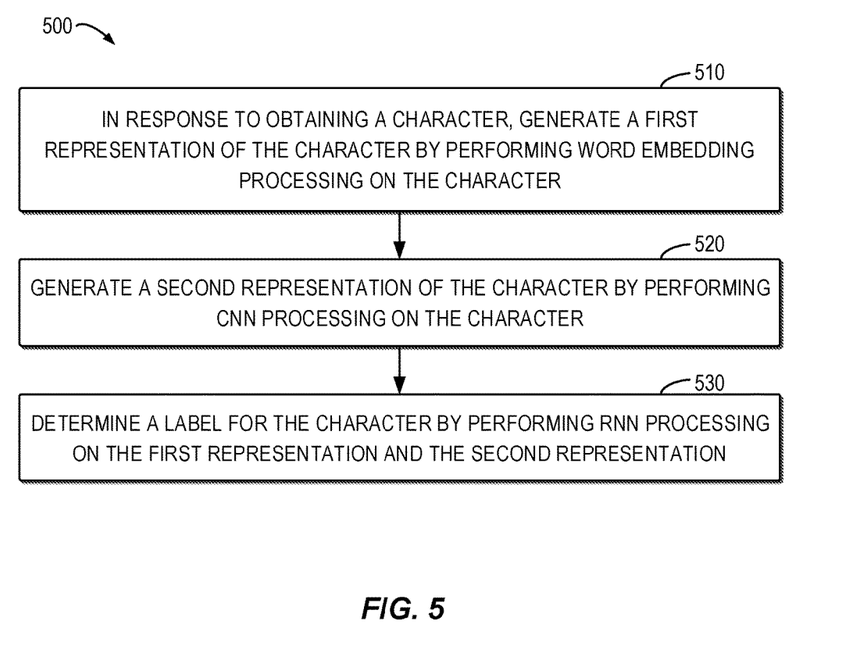
FIG. 5 is a flow chart of the method of performing Chinese sequence labeling in accordance with embodiments of the present disclosure.

FIG. 5 is a flow chart of the method 500 of performing Chinese sequence labeling in accordance with embodiments of the present disclosure. The method 500 may be implemented in the computer system/server 12 as shown in FIG. 1. The method 500 is entered at 510, where a first representation of a character is generated by performing word embedding processing on the character, in response to receiving the character. The first representation may be related to context of the character.

At 520, a second representation of the character is generated by performing CNN processing on the character. The second representation is related to a hieroglyphic feature of the character. At 530, a label for the character is determined by performing RNN processing on the first representation and the second representation, to facilitate natural language processing for the character. The label indicates an attribute of the character related to the context. In accordance with embodiments of the present disclosure, the method 500 can extract hieroglyphic features from the Chinese words to enhance sequence labeling tasks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    in response to receiving a character, generating a first representation of the character by performing word embedding processing on the character, the first representation being related to a context of the character;
    generating a second representation of the character by performing convolutional neural network (CNN) processing on a stroke of the character, the second representation being related to a hieroglyphic feature of the character, wherein the CNN processing comprises performing a Wubi Chinese character encoding method on the stroke; and
    determining a label for the character by performing recurrent neural network (RNN) processing on the first representation and the second representation, the label indicating an attribute of the character related to the context.

2. The method of claim 1, wherein generating a second representation of the character by performing CNN processing on the character comprises:
    generating a stroke representation from the stroke of the character; and
    generating the second presentation by performing the CNN processing on the stroke representation.

3. The method of claim 2, wherein generating the second presentation by performing the CNN processing on the stroke representation comprises:
    expanding the stroke representation with a padding, the padding representing a dummy stroke; and
    generating the second presentation by performing the CNN processing on the expanded stroke representation.

4. The method of claim 2, wherein performing the CNN processing on the stroke representation comprises:
    performing convolution processing and sampling processing on the stroke representation.

5. The method of claim 1, wherein performing CNN processing on the character comprises:
    performing the CNN processing on an image of the character.

6. The method of claim 5, wherein performing the CNN processing on an image of the character comprises:
    performing convolution processing, sampling processing and full-connection processing on the image.

7. The method of claim 1, wherein determining a label comprises:
    performing RNN processing on the first representation and the second representation to determine an intermediate label; and
    performing conditional random fields processing on the intermediate label to determine the label.

8. A system comprising:
    one or more processors, a memory coupled to at least one of the processors, a set of computer program instructions stored in the memory and executed by at least one of the processors to perform a method comprising:
        in response to receiving a character, generating a first representation of the character by performing word embedding processing on the character, the first representation being related to a context of the character;
        generating a second representation of the character by performing convolutional neural network (CNN) processing on a stroke of the character, the second representation being related to a hieroglyphic feature of the character, wherein the CNN processing comprises performing a Wubi Chinese character encoding method on the stroke; and
        determining a label for the character by performing recurrent neural network (RNN) processing on the first representation and the second representation, the label indicating an attribute of the character related to the context.

9. The system of claim 8, wherein the method further comprises:
    generating a stroke representation from the stroke of the character; and
    generating the second presentation by performing the CNN processing on the stroke representation.

10. The system of claim 9, wherein the method further comprises:
    expanding the stroke representation with a padding, the padding representing a dummy stroke; and
    generating the second presentation by performing the CNN processing on the expanded stroke representation.

11. The system of claim 9, wherein the method further comprises:
    performing convolution processing and sampling processing on the stroke representation.

12. The system of claim 8, wherein the method further comprises:
    performing the CNN processing on an image of the character.

13. The system of claim 12, wherein the method further comprises:
    performing convolution processing, sampling processing and full-connection processing on the image.

14. The system of claim 8, wherein the method further comprises:
    performing RNN processing on the first representation and the second representation to determine an intermediate label; and
    performing conditional random fields processing on the intermediate label to determine the label.

15. A computer program product, the computer program product comprising a computer readable storage medium having program instructions embodied therewith, the program instructions executable by a device to cause the device to perform a method comprising:
    in response to receiving a character, generating a first representation of the character by performing word embedding processing on the character, the first representation being related to a context of the character;
    generating a second representation of the character by performing convolutional neural network (CNN) processing on a stroke of the character, the second representation being related to a hieroglyphic feature of the character, wherein the CNN processing comprises performing a Wubi Chinese character encoding method on the stroke; and determining a label for the character by performing recurrent neural network (RNN) processing on the first representation and the second representation, the label indicating an attribute of the character related to the context.

16. The computer program product of claim 15, wherein the method further comprises:
   generating a stroke representation from the stroke of the character; and
   generating the second presentation by performing the CNN processing on the stroke representation.

17. The computer program product of claim 16, wherein the method further comprises:
   expanding the stroke representation with a padding, the padding representing a dummy stroke; and
   generating the second presentation by performing the CNN processing on the expanded stroke representation.

18. The computer program product of claim 16, wherein the method further comprises:
   performing convolution processing and sampling processing on the stroke representation.

19. The computer program product of claim 15, wherein the method further comprises:
   performing the CNN processing on an image of the character.

20. The computer program product of claim 19, wherein the method further comprises:
   performing convolution processing, sampling processing and full-connection processing on the image.

* * * * *